(12) United States Patent
Sadan

(10) Patent No.: US 8,388,702 B2
(45) Date of Patent: Mar. 5, 2013

(54) CONVECTIVE DISSOLUTION OF SALTS IN SITU PONDS

(76) Inventor: Abraham Sadan, Park City, UT (US)

( * ) Notice: Subject to any disclaimer, the term of this patent is extended or adjusted under 35 U.S.C. 154(b) by 396 days.

(21) Appl. No.: 12/890,245

(22) Filed: Sep. 24, 2010

(65) Prior Publication Data

US 2011/0085963 A1 Apr. 14, 2011

Related U.S. Application Data

(60) Provisional application No. 61/250,497, filed on Oct. 10, 2009.

(51) Int. Cl.
*B01D 9/00* (2006.01)

(52) U.S. Cl. .......................................... 23/296; 23/295 R
(58) Field of Classification Search .................... 23/296, 23/295 R, 300, 301
See application file for complete search history.

(56) References Cited

U.S. PATENT DOCUMENTS 5,505,924 A * 4/1996 Johnson ........................ 422/254

* cited by examiner

*Primary Examiner* — Edward Johnson
(74) *Attorney, Agent, or Firm* — Steven L. Rinehart

(57) ABSTRACT

A unique method of convective dissolution of salts from in situ ponds by trenching salt beds, introducing dissolution waters to promote convective dissolution, pumping out the saturated solution from the pond bottom, and introducing additional dissolution waters.

17 Claims, 2 Drawing Sheets

CONVECTIVE DISSOLUTION OF SALTS IN SITU PONDS

CROSS-REFERENCES TO RELATED APPLICATION

This application is a continuation-in-part of, and claims priority to, U.S. Provisional Patent Application No. 61/250,497 entitled "Dissolution of Salts in Situ Crystallization Ponds", filed on Oct. 10, 2009 for Abraham Sadan, which is incorporated herein by reference.

BACKGROUND OF THE INVENTION

1. Field of the Invention

The present invention relates generally to in situ ponds. More specifically, the present invention relates to methods of dissolving (or dissoluting) salts and other soluble minerals in situ ponds and other areas of salts accumulation.

2. Description of the Related Art

The process of producing solar salt involves pumping or feeding seawater or lake water by gravity to ponds for solar evaporation. In the first evaporation, the seawater is concentrated until it reaches saturation. Saturation is the concentration beyond which any further evaporation would result in the crystallization of Salt. Close to the end of the concentration process, gypsum calcium sulfate dihydrate starts to precipitate ("gypsum"). The gypsum continues to precipitate until the gypsum concentration diminishes. At that concentration the NaCl saturated solution is transferred to crystallization ponds where salts crystallize out.

The NaCl, which contains gypsum cannot be marketed and therefore is left to accumulate in the ponds where it originally precipitated. When the ponds fill up, other ponds need to be added to serve that purpose.

The Dead Sea Works in Israel and the Arab Potash Company in Jordan are processing carnallite for potash production. The carnallite a hydrated double salt of magnesium chloride and potassium chloride and is obtained by evaporation of the Dead Sea waters. NaCl precipitate first before reaching the potassium salt carnallite saturation. The NaCl continues to crystallize with the carnallite for a short while, rendering the carnallite too contaminated for processing.

The contaminated carnallite is dredged and dissolved to maintain the ponds in operation. In Utah, the US Magnesium operation recovers magnesium metal from the Great Salt Lake waters. The waters are evaporated to reach the magnesium chloride concentration that is necessary for metal recovery. NaCl and other potassium salts precipitate and accumulate in the ponds.

Dykes need to be raised for holding the Salts. The attempts to bring about the dissolution of the accumulated salts by way of flooding the salt ponds with seawater, or lake water brings limited results. The water in contact with the salt surface reached saturation in the process of dissolution, became heavy, contained about 26 grams of NaCl and reached a specific gravity of 1.2 gram/cc.

That layer of saturated solution serves as a shield, not allowing the fresh seawater above it to reach the NaCl below. In effect the dissolution stops. Also, dust and sand in the seawater cover the NaCl layer and interfere with the dissolution.

The Lithium operation in Salar De Atacama in Chile, the last crystallization pond contains the double salt $LiCl.MgCl_2.6(H_2O)$. which needs to be harvested for the recovery of LiCl. Convective dissolution in situ, the pond would recover the LiCl and bring about the precipitation of bischofite, $MgCl_2.6(H_2O)$.

It is therefore desirable to provide a convective dissolution system to recover the most soluble salt in the first step while the remainder less soluble salt in the second step.

SUMMARY

From the foregoing discussion, it should be apparent that a need exists for a means of more effectively dissoluting salt in situ ponds.

The present invention has been developed in response to the present state of the art, and in particular, in response to the problems and needs in the art that have not yet been fully solved by currently available inventions.

Accordingly, the present invention has been developed to provide a method of realizing convective dissolution of salts in situ ponds. The steps of the method comprise trenching one or more trenches in salt bed(s) in an evaporation pond; introducing dissolution water to the salt bed(s); pumping out the saturated solution from the bottom of the evaporation pond to a separate location; and introducing dissolution water to the salt bed(s).

In some embodiments, the salt bed(s) in the evaporation pond substantially comprise a double salt comprising salts of differing solubilities, while in other embodiments, the salt bed(s) in the evaporation pond substantially comprise a plurality of salts of differing solubilities.

In further embodiments, the plurality of salts of differing solubilities are imported to the evaporation pond from other locales, while in alternative embodiments, the plurality of salts are imported to the evaporation pond in such a manner as to form natural trenches.

In other embodiments of the method, the trenching step is accomplished using mechanical trenching equipment. The trenching step may also be accomplished using one or of the group consisting of irrigation tape(s) and irrigation pipe(s).

In some variation, the introducing step only introduces water to the salt beds until the trenches are less than half full, while in other variations, the pumping step is continued until a predetermined criterion is satisfied.

The method of claim 1, wherein the introducing step is repeated non-continuously while pausing to wait for the saturation level to reach a predetermined threshold.

The steps of another embodiment of the method comprise installing drip irrigation tape over one or more salt bed(s); pumping saturated solution from the bottom of the salt bed(s) to a separate location; and introducing additional dissolution water to salt beds via the irrigation tape at predetermined rate.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
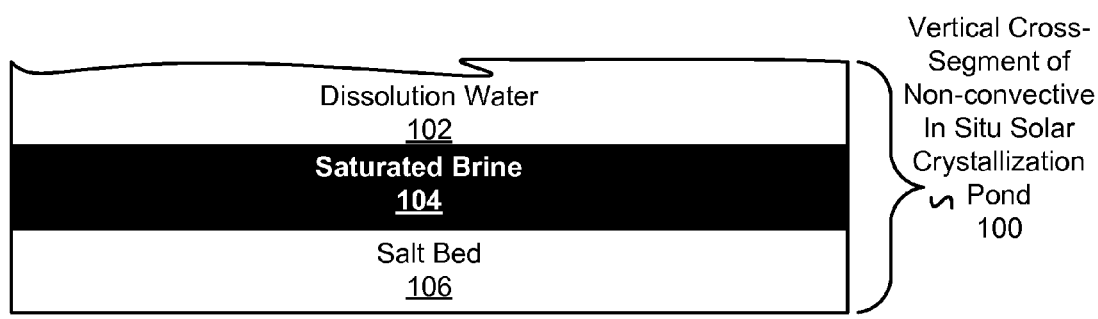
FIG. 1 sets forth a basic process flow diagram for key elements involved in non-convective solar dissolution of salt in accordance with the present invention.

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Provided herein is a technology to overcome the pitfalls inherent in the conventional dissolution methods. In older solar evaporation ponds, waters which have completed the dissolution and become saturated need to be removed to expose the NaCl to fresh seawater.

In convective dissolution, trenches are dug in the salt beds such that heavy saturated solution sinks to the bottom of the trench where it is removed by pumping. This trenching may be accomplished using means and equipment well-known to those of skill in the art. The vertical convection motion along the trenches walls continued as long as more fresh seawater was introduced, and the saturated solution is removed. In other embodiments, where the salt bed is too soft to support heavy equipment, trenches are made by drip irrigation tapes. Drip irrigation tape sparsely spread over a pond's salt bed drip droplets of water continuously. The droplets do dissolve the salt and provide more room for the next droplet and in time a trench is formed under the irrigation tape.

Irrigation tapes are commonly used to irrigate fields for growing a variety of fruits, vegetables and the like. Irrigation tapes feed water at a low rate required by plants for optimal growth.

When the irrigation tapes are placed on a drained bed of salts, the water the tapes disperse dissolves the salt underlying the tape, and the tapes progress downward with time to form trenches. Irrigation tapes, in the present invention, may be placed in this manner to form trenches where desired. Irrigation pipes can be used similarly.

The irrigation pipes and irrigation tape can be left at the bottom of the trenches, which form future ponds, for both pumping in dissolution water (usually a less than saturated solution), and for pumping out dissolution water that has subsequently become saturated with one or more salts.

Drip irrigation tapes are excellent instruments for making trenches at low cost over large area. In certain embodiments where salt is sufficiently hard as to pose hardship for mechanical trenching, the drip irrigation tapes are the preferred embodiment. In salt crystallization ponds, the drip irrigation tapes can be left on the bottom of the salt pond, allowing new salt to build up on top and when time comes for dissolution, they are already in place for another round of dissolution.

In some embodiments, the interstices of the salt bed are laden with heavy brine that needs to be pumped out or removed by gravity to allow the dissolution waters to function. The dissolution will progress until the concentration level of the brine is reached and then stops. That phenomena gives the dissolution operators control on the dissolution. They can control the amount of salt to be dissoluted.

One way to conduct the dissolution is by flooding the pond and raising the water level up to the salt surface. In this manner way the trenches will widen till one trench combines with another to form a larger trench. If the trenches are afar from each other a large area will be exposed to evaporation, a fact that may not be desirable. Another way to carry out the dissolution operation is by the dissolution of the lower layer of the salt bed to affect the undercutting of the salt bed and affect the bed to sink, not necessarily to widen the trenches.

Solar crystallization ponds can reach sizes of five hundred acres, and produce more than half a million tons of salt.

For the purposes of this invention, the term "salt" refers to sodium chloride, potassium salts, sulfate salts and any other soluble chemical or mineral.

For the purposes of this invention, the terms "natural water," "brine," and "water" refers to water from any natural source, including oceans, seas, lagunas, lakes, brackish, regular brackish water or any unsaturated brine.

FIG. 1 sets forth a basic process flow diagram for key elements involved in non-convective solar dissolution of salt in accordance with the present invention.

In various tests conducts on salt beds, trenches were dug in the salt beds by heavy equipment trenchers. Salt ponds were flooded with seawater to bring about the salt dissolution within two months. In other experiments, drip irrigation tapes were installed on a bed of kainite to bring about the dissolution of kainite.

Using the teachings of the present invention, the salts in double salts comprising salts of differing solubilities, such as $MgCl_2.KCl.6(h_2O)$, will be dissolved in order of highest solubility. For instance, $MgCl_2$ will be dissolved first, while KCl will be convectively dissolved later and recovered.

The teachings of the present invention will also result in the salt $LiCl.MgCl_2.6(h_2O)$, having LiCl dissolve first, following subsequently by $MgCl_2$.

In some embodiments of the present invention, a mixture of salts in an evaporation pond of differing solubilities will result in the most soluble salt being dissolved and first; such as in a salt mixture consisting of LiCl, $MgCl_2$, NaCl, and KCL, the LiCl will be dissolved first and recovered.

In some embodiments of the present invention, the evaporation pond comprises a drained bed of salt comprising numerous interstices created by heat and/or precipitation. These interstices are filled with ambient air, and comprise, in some cases, close to 50% of the volume of the dry salt bed or ore body.

Dissolution water may be introduced to the surface of the dry salt bed, filling the interstices, and beginning convective dissolution of the salt or ore in the interstices.

During dissolution, the heavier solutions, saturated with higher soluble salt(s), sink to the bottom of the dissolution water and is pumped out from the bottom, while brines are added to the top.

The size of the interstices grows as ore and salts are removed and the convective dissolution is realized, making laying piping and irrigation tape easier.

Figure 2:
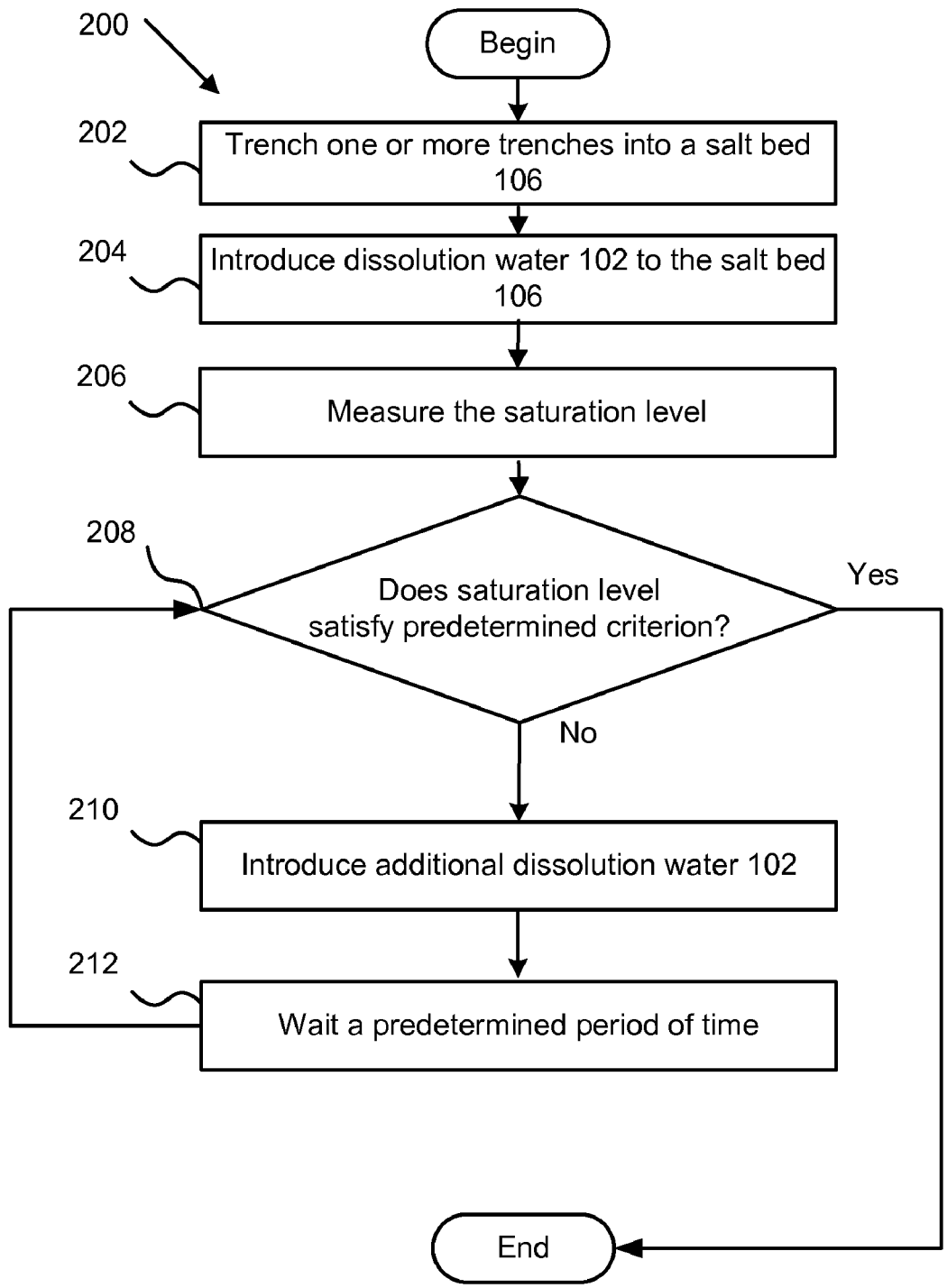
FIG. 2 is a flow chart of a unique method of dissoluting salt convectively in accordance with the present invention.

FIG. 2 is a flow chart of a unique method of dissoluting salt convectively in accordance with the present invention.

The method 200 begins 202 when one or more trenches are dug in a salt bed for use in convective dissolution of salts in situ ponds or in situ crystallization ponds.

The trenches may be dug using means well-known to those of skill in the art, or may be dug using irrigation pipes or irrigation tape. In some embodiments, the water seeping, or being forced, out of irrigation pipes and/or tapes dissolves salt(s) in the salt beds, creating the trenches.

The method 200 progresses and dissolution water 102 in introduced 204 to the salt bed(s) 106. This dissolution water may be introduced using means well-known to those of skill in the art. In some embodiments, the dissolution water is introduced via pipes and/or tubing underlying the bottom of the trenches. In some embodiments, the dissolution water 102 is introduced beneath the saturated solution comprising one or more salts in the pond.

The method progresses and the saturation level of the of the pond is measured 206 using means well-known to those of skill in the art.

If the saturation level meets, exceeds, satisfies 208, or falls below a predetermined criterion, or predetermined threshold, the method 200 may end, or may proceed.

The predetermined threshold, or predetermined criterion, is predetermined to be an economically efficient cut off point for the method by a human being or a computer by analyzing historical data.

If the saturation level fails to meet, exceed, satisfy 208, or fall below the predetermined threshold, the method 200 proceeds and additional dissolution water 102 in introduced 210 to the pond. The method 200 then proceeds by waiting 212 a predetermined amount of time for more evaporation and/or crystallization to take place in the pond.

The predetermined amount of time may be predetermined by a human being to approximate the amount of time necessary for increased dissolution, evaporation and/or crystallization to be realized, or the predetermined amount of time may be predetermined by a computer tracking saturation levels, the rate of saturation level changes over time, and/or the ambient temperature.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of realizing convective dissolution of salts in situ ponds, the steps of the method comprising:
   trenching one or more trenches in salt bed(s) in an evaporation pond;
   introducing dissolution water to the salt bed(s);
   pumping saturated solution from the bottom of the trenches to a separate location; and
   introducing dissolution water to the salt bed(s).

2. The method of claim 1, wherein the salt bed(s) in the evaporation pond substantially comprise a double salt comprising salts of differing solubilities.

3. The method of claim 1, wherein the salt bed(s) in the evaporation pond substantially comprise a plurality of salts of differing solubilities.

4. The method of claim 3, wherein the plurality of salts of differing solubilities are imported to the evaporation pond from other locales.

5. The method of claim 4, wherein the plurality of salts are imported to the evaporation pond in such a manner as to form natural trenches.

6. The method of claim 1, wherein the trenching step is accomplished using mechanical trenching equipment.

7. The method of claim 1, wherein the trenching step is accomplished using one or of the group consisting of irrigation tape(s) and irrigation pipe(s).

8. The method of claim 3, wherein the introducing step only introduces water to the salt beds until the trenches are less than half full.

9. The method of claim 1, wherein the pumping step is continued until a predetermined criterion is satisfied.

10. The method of claim 1, wherein the introducing step is repeated non-continuously while pausing to wait for the saturation level to reach a predetermined threshold.

11. The method of claim 1, further comprising:
    installing drip irrigation tape over one or more salt bed(s); and
    introducing additional dissolution water to salt beds via the irrigation tape at predetermined rate.

12. A method of realizing convective dissolution of a double salt in situ ponds, wherein the double salt comprises $MgCl_2.KCl.6(H_2O)$, the steps of the method comprising:
    introducing measured amounts of dissolution water, wherein the amount of dissolution water is sufficient to dissolve less than all of a double salt in an evaporation pond;
    dissolving the substantial majority of the $MgCl_2$ in the evaporation pond;
    allowing the double salt to decompose and precipitate KCl; and
    pumping a saturated $MgCl_2$ solution out of the bottom of the evaporation pond.

13. The method of claim 12, wherein the steps of claim 12 are cyclically repeated until a predetermined concentration of KCl remains in the evaporation pond.

14. The method of claim 12, further comprising:
    introducing additional dissolution water to dissolve the KCl; and
    pumping out the additional dissolution water.

15. The method of claim 12, wherein the double salt comprises $LiCl.MgCl_2.6(H_2O)$ rather than $MgCl_2.KCl.6(H_2O)$.

16. The method of claim 15, wherein the allowing step results in the precipitation of LiCl instead of KCl.

17. A method of realizing convective dissolution of a mixture of a salt mixture in situ ponds, wherein the salt mixture comprises LiCl, $MgCl_2$, NaCl, and KCl, the steps of the method comprising:
    introducing measured amounts of dissolution water, wherein the amount of dissolution water is sufficient to substantially dissolve only the most soluble salt in the salt mixture;
    dissolving LiCl in the evaporation pond;
    pumping a saturated LiCl solution out of the bottom of the evaporation pond;
    introducing measured amounts of dissolution water, wherein the amount of dissolution water is sufficient to substantially dissolve only the second most soluble salt in the salt mixture;
    dissolving $MgCl_2$ in the evaporation pond;
    pumping a saturated $MgCl_2$ solution out of the bottom of the evaporation pond;
    introducing measured amounts of dissolution water;
    dissolving KCl and NaCl in the evaporation pond; and
    pumping a saturated KCl and NaCl solution out of the bottom of the evaporation pond.

* * * * *